(12) United States Patent
Carter

(10) Patent No.: US 8,281,374 B2
(45) Date of Patent: Oct. 2, 2012

(54) ATTESTED IDENTITIES

(75) Inventor: Stephen R. Carter, Spanish Fork, UT (US)

(73) Assignee: Oracle International Corporation, Redwood Shores, CA (US)

( * ) Notice: Subject to any disclaimer, the term of this patent is extended or adjusted under 35 U.S.C. 154(b) by 1145 days.

(21) Appl. No.: 11/225,994

(22) Filed: Sep. 14, 2005

(65) Prior Publication Data

US 2007/0061872 A1 Mar. 15, 2007

(51) Int. Cl.
*H04L 29/06* (2006.01)
(52) U.S. Cl. .................. 726/6; 726/8; 726/21; 713/156
(58) Field of Classification Search .............. 726/5, 6, 726/7, 8, 10, 18, 19, 21, 30; 713/155, 156, 713/161, 168, 173, 175, 176, 179, 183, 185
See application file for complete search history.

(56) References Cited

U.S. PATENT DOCUMENTS

| | | | |
|---|---|---|---|
| 5,388,213 A | 2/1995 | Oppenheimer et al. | |
| 5,544,322 A * | 8/1996 | Cheng et al. ................... | 709/229 |
| 5,987,134 A | 11/1999 | Shin et al. | |
| 6,041,411 A | 3/2000 | Wyatt | |
| 6,073,234 A | 6/2000 | Kigo et al. | |
| 6,107,931 A | 8/2000 | Nicholson | |
| 6,516,416 B2 | 2/2003 | Gregg et al. | |
| 6,615,352 B2 | 9/2003 | Terao et al. | |
| 6,671,350 B1 | 12/2003 | Oxley | |
| 6,836,843 B2 | 12/2004 | Seroussi et al. | |
| 6,871,279 B2 * | 3/2005 | Sames et al. ................... | 713/185 |
| 6,931,440 B1 | 8/2005 | Blumenau et al. | |
| 7,290,288 B2 | 10/2007 | Gregg et al. | |
| 7,350,237 B2 | 3/2008 | Vogel et al. | |
| 7,788,366 B2 | 8/2010 | Yacoby et al. | |
| 7,788,711 B1 * | 8/2010 | Sun et al. ...................... | 726/8 |
| 2002/0138735 A1 | 9/2002 | Felt et al. | |
| 2003/0070091 A1 | 4/2003 | Loveland | |
| 2003/0131232 A1 | 7/2003 | Fraser et al. | |
| 2004/0064568 A1 | 4/2004 | Arora et al. | |
| 2004/0128506 A1 * | 7/2004 | Blakley et al. ................ | 713/170 |
| 2004/0139319 A1 | 7/2004 | Favazza et al. | |
| 2005/0068983 A1 | 3/2005 | Carter et al. | |
| 2005/0120201 A1 | 6/2005 | Benaloh et al. | |
| 2005/0144144 A1 | 6/2005 | Graff | |
| 2005/0204129 A1 | 9/2005 | Sudia et al. | |
| 2005/0254652 A1 | 11/2005 | Engler et al. | |
| 2005/0257045 A1 | 11/2005 | Bushman et al. | |
| 2006/0200680 A1 | 9/2006 | Ellison et al. | |
| 2007/0112574 A1 | 5/2007 | Greene | |
| 2007/0143824 A1 | 6/2007 | Shahbazi | |
| 2007/0180490 A1 | 8/2007 | Renzi et al. | |
| 2007/0244833 A1 | 10/2007 | Camenisch | |

OTHER PUBLICATIONS

"European Application No. 07122559 Search Report", (Apr. 10, 2008), 2 pgs.

(Continued)

*Primary Examiner* — Gilberto Barron, Jr.
*Assistant Examiner* — Izunna Okeke
(74) *Attorney, Agent, or Firm* — Kilpatrick, Townsend & Stockton LLP

(57) ABSTRACT

Attested identities are provided. An applicant requests an attested identity. Attesting resources provide assertions that include roles, rights, and privileges for the attested identity. The collection of assertions from each of the attesting resources represents the attested identity.

21 Claims, 3 Drawing Sheets

OTHER PUBLICATIONS

Abbie Barbir Nortel Networks, "Overview and Summary of SAML v. 2", (Oct. 5, 2004), 7 pgs.

Hughes, J, et al., "Security Assertion Markup Language: Technical Overview", (Sep. 12, 2005), 40 pgs.

Poniszewska-Maranda, A, "Role engineering of information system using extended RBAC model", *Enabling Technologies: Infrastructure for collaborative enterprise, 14th IEEE Workshops on Linkoping*Sweden Jun. 13-15, 2005, 154-159.

Siemens, Gunther C, "SAML in Authorization Policies", (Feb. 13, 2005), 7 pgs.

"European Search Report for Application No. EP 06 12 0149", 6 Pages.

Hallam-Baker, Phillip, "Security Assertions Markup Language", *Security Assertions Markup Language, Core Assertion Architecture—Examples and Explanatins, Draft Version 0.7*, (May 14, 2001) 24 Pages.

\* cited by examiner

ATTESTED IDENTITIES

FIELD

The invention relates generally to network security and more particularly to techniques for creating and maintaining attested identities.

BACKGROUND

Typically, an identity for a user is acquired from a particular service and for a particular purpose. For example, if a user wants to buy something from an on-line auctioning service, the user first establishes an identity with the on-line auction service by applying for user identification and a password with the on-line auctioning system.

A single user may literally have dozens of user identifications and passwords for a variety of services. Each individual user identification and password pair is usually managed by the service to which it is directed and also separately managed by the user for which it is assigned.

The decentralized nature of identity management over the Internet has created a variety of problems. For example, identity theft is a common reported problem. One reason identity theft is so problematic is because of conventional procedures that are used for issuing and consuming personal information. The personal information is used to establish an identity. The procedures are often established by the services, and the services are not adept in identity management; rather the services are skilled in selling their products.

As a result, the users and the enterprises associated with the electronic services are facing mounting issues. A user may have his/her personal information compromised and lose funds, while an enterprise may have its confidential information compromised and lose funds in bogus transactions with malicious users feigning their identities as legitimate users.

Moreover, an identity is generally not temporary and generally not designed to be used for a particular purpose with conventional services. That is, a user provides some of the same personal information for each different service where access is desired. The different services recognize the personal information as the same user. So, personal information is literally being propagated over the Internet on a regular basis and stored in a variety of duplicative locations. The user has no idea and has no assurances that the storage areas are secure. This means the user's personal information, which is used to establish an identity, is available on a nearly permanent basis from a variety of potential locations; and still the user is forced to continually and repetitively use personal information in order to transact over the Internet. So, the problem perpetuates itself.

Accordingly, improved techniques for identity creation, maintenance, and use are desirable.

SUMMARY

In various embodiments, attested identities are presented. More specifically, and in an embodiment, a method for creating an attested identity is provided. A request is received for an identity from an applicant. Attesting resources are notified of the request and one or more assertions are acquired from the attesting resources for the identity. Finally, the identity with the one or more attestations is provided to the applicant.

DETAILED DESCRIPTION

Figure 1:
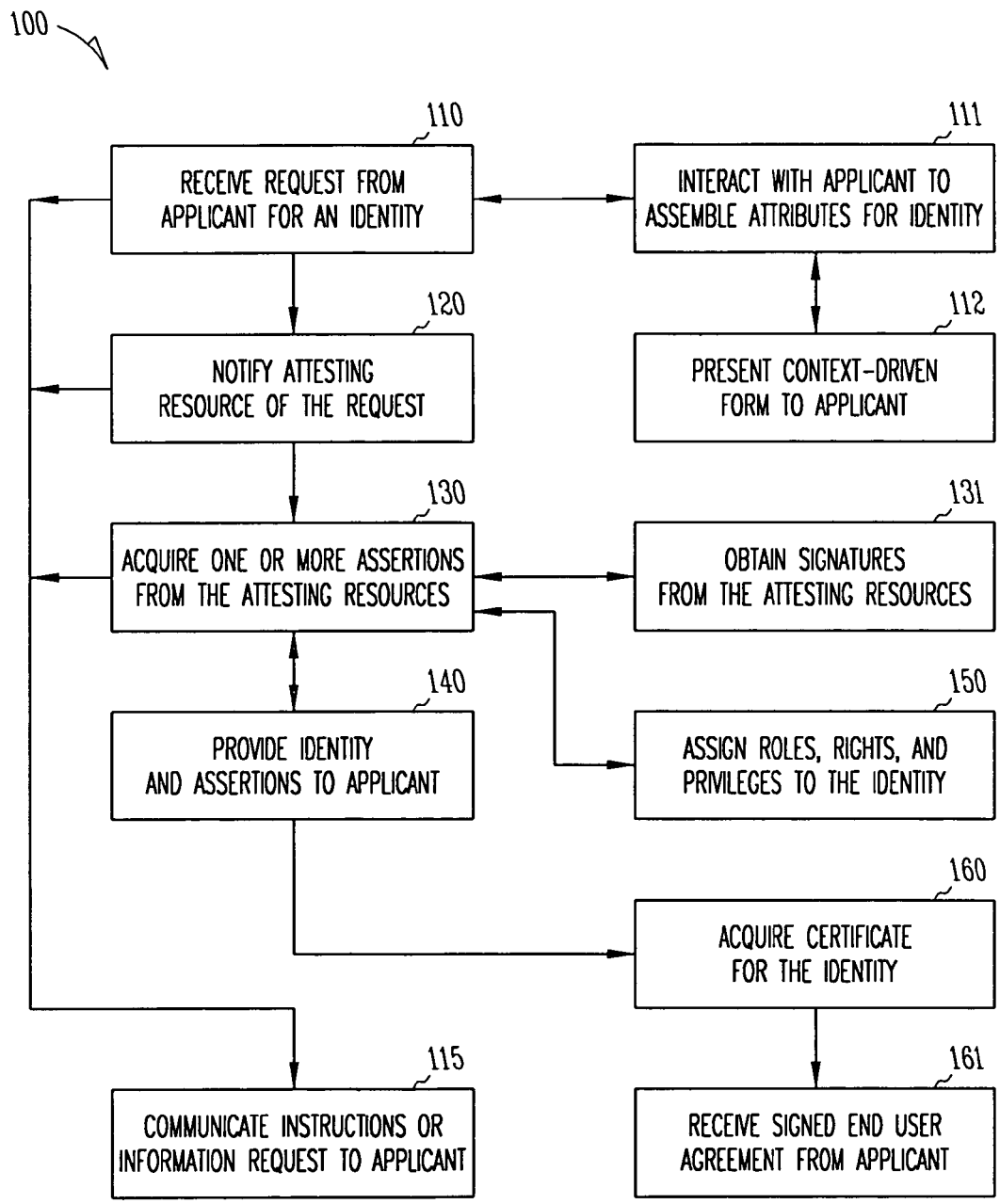
FIG. 1 is a diagram of a method for creating an attested identity, according to an example embodiment.

A "resource" includes a service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from a one or more identifiers and secrets that provide a statement of rights and permissions that the identity has in relation to resources. An "identifier" is information, usually private or secret information that permits an identity to be formed. Some examples of identifiers include social security number (SSN), user identification and password, account number, retina scan, fingerprint, face scan, any other biometrics, etc. As more and more identifiers are accumulated, a confidence in a particular identity grows stronger and stronger.

"Authentication" is the process of validating the association of identifiers and secrets according to a policy, which is specific to the context in which the resulting identity is to be used. Thus, when identifiers are validated within a context specific to how an identity is to be used, it is authentication.

An "attested identity" is a collection of attributes, roles, rights, privileges, and assertions; the validity of which is attested to by attesting resources according to stated policy. The activation of an attested identity involves the application of policy and testing of assertions, such that access to a resource is allowed, denied, partially allowed, or restricted in some manner.

An "assertion" is a statement or any data structure that may include the roles, rights, and privileges for a given resource. The statement includes an indication as to who made the statement and under what authority such attesting resource had to make the statement. In some cases, the assertion includes a signature of the attesting resource.

In an embodiment, the assertion is in a Security Access Method Language (SAML) format or a Liberty format. Although it is to be understood, that the assertion may be in any format. An assertion may be presented to a resource to be given access; once the resource assures itself that the assertion is legitimate then access is granting according to the roles, rights, and privileges defined in the assertion.

An "attesting resource" is a particular designation for a resource that has permission and authority to grant an attestation. Access to the resource is allowed if a policy protecting the resource is satisfied by the attestations available. The attesting resource generates assertions when requested to do so according to policy for identity applications.

The creation, maintenance, and use of attested identities are discussed in detail herein and below. In some embodiments, an identity service is used. Examples of an identity service can be found in: U.S. Pat. No. 7,299,493 ("Techniques for Dynamically Establishing and Managing Authentication and Trust Relationships"), U.S. Pat. No. 7,647,256 ("Techniques for Establishing and Managing a Distributed Credential Store"), and U.S. Pat. No. 7,316,027 ("Techniques for Dynamically Establishing and Managing Trust Relationships"). These applications are commonly assigned to Novell, Inc. of Provo, Utah and the disclosures of which are incorporated by reference herein.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for creating an attested identity, according to an example embodiment. The method 100 (hereinafter "attested identity service") is implemented in a machine-accessible and readable medium. The attested identity service establishes an attested identity on behalf of a principal requestor. In an embodiment, the attested identity service represents a modified version of the identity services discussed above; the modifications reflect the processing discussed below with this FIG. 1.

Initially, a known or unknown principal contacts the attested identity service for purposes of acquiring an attested identity. The attested identity is a collection of assertions, roles, rights, and privileges, which the unknown principal may use to acquire access to one or more resources. Each of the desired resources is represented by policy statements that test the validity of assertions. The attested identity service initially recognizes the known or unknown principal as an Identity Applicant (IA).

Accordingly, at 110, the attested identity service receives a request from an IA to establish an attested identity. In an embodiment, at 111, the request triggers a session between the IA and the attested identity service where the two interact with one another for purposes of the attested identity service acquiring attributes for the attested identity. For example, if the IA is an employee of Novell®, then the attested identity service may receive with the request or with the interaction an employee number. The employee number (an identifier) permits the attested identity service to access one or more identity or enterprise stores to acquire attributes associated with the employee number of name, address, birth date, etc.

According to an embodiment, at 112, the attested identity service may interact with the IA with a context-driven form. This interaction via a form may occur over the Internet using a World-Wide Web (WWW) browser with WWW applets and pages. The context-driven form presents an example of one mechanism for which an IA can submit information to have the attested identity service create an attested identity.

With the example embodiment, at 112, the context-driven form provides the IA with a high-level interaction of a question and answer session between the attested identity service (interviewer) and the IA (interviewee). For example, if the IA were to click an engineering group selection on the form, then form will revert automatically to questions that are pertinent to an applicant seeking an attested identity in the context of an engineering department. In this manner, the form is context driven and adapted to change as answers are received from the IA.

At this point, according to some embodiments, the attested identity service can establish a preliminary attested identity having certain roles, rights, and privileges. This may be viewed as a placeholder and communicated to the IA, but the roles, rights, and privileges are extremely limited and with limited application. The process of creating the preliminary attested identity is driven by policy.

In an embodiment, at 115, the attested identity service may communicate to the IA that more information requests are desired to complete the attested identity application or may communicate that certain instructions have to be performed by the IA to complete the application. Some communication may be provided in real time via the same session that the attested identity service and IA are interaction. Other communication may be achieved via out-of-band techniques, such as electronic mail (email), etc.

At 120, the attested identity service notifies one or more attesting resources which appear to be affected by the application for an attested identity received from the IA. So, as an example, if the application requests access to a particular directory service, the attested identity service notifies an attesting resource associated with the directory service resource for purposes of receiving an assertion that indicates whether access for the IA to the directory service is to be granted, denied, partially allowed, or unresolved at the present time. The actions of an attesting resource are discussed below with the method 200 of FIG. 2.

It should be noted that the processing of the attested identity service represented by the FIG. 1 is iterative and may be processed in a variety of sequences and repeated in a variety of manners. For example, the processing of 111, 112, and 115 may continue and repeat while the processing of 120 takes place. Thus, the attested identity service may regularly update its version of the attested identity being assembled; it may update specific roles, rights, and privileges or even add new roles, rights, and privileges. Furthermore, the processing at 120 may suspend while more information is requested by the attesting resources and communicated to the IA back through the attested identity service. In some cases, a particular instance of the processing at 120 for one attesting resource may be dependent, based on policy, on another instance of processing at 120 for a different attesting resource. In such cases, the processing at 120 may also be temporarily paused for the waiting attesting resource. It should be clear from these illustrations that the attested identity service is not to be viewed as a linear process, it is a dynamic and event driven process that is regularly updated, which causes modifications to occur in the attested identity being assembled.

At 130, one or more assertions are acquired from the attesting resources for the attested identity being assembled for the IA. Each assertion is for a given role or permission that was necessitated by the application for the attested identity in response to information provided by the IA. Moreover, each assertion identifies the attesting resource and identifies roles, rights, and privileges for its associated resource.

In an embodiment, at 131, each assertion is digitally signed by its corresponding attesting resource. This provides authenticity to the assertions and may be a required pursuant to policy associated with some resources. Any signing technique may be used.

At 140, the assertions are assembled and provided to the IA as the attested identity. It should be noted, that the processing at 140 may actually be viewed as an update to an already provided attested identity, since the attested identity service may initially provide a very limited attested identity and then regularly provide updates as attesting resources respond with assertions with respect to resources desired by the IA according to information provided during the application process.

Thus, the processing at 140 may itself me repeated as many times as are needed until the IA has a completed attested identity.

Furthermore, as roles, rights, and privileges are activated the attested identity service may notify the IA and that notification may serve as providing, the attested identity, at 140, since the attested identity may be acquired in updated form from the attested identity service by the IA. So, the attested identity may reside within the local environment of the attested identity service so as to provide centralized management and acquired on demand from the IA and as updates are made, the IA is notified.

According to an embodiment, at 150, roles, rights, and privileges may be assigned to the attested identity. The roles, rights, and privileges may apply to the attested identity's interaction with the attested identity service and may apply to each assertion assembled in the attested identity for a particular desired resource of the attested identity. So, roles, rights, and privileges define accesses to defined resources and one resource may in fact be the attested identity service itself.

In some embodiments, at 160, the attested identity service may be used to facilitate the acquisition of a public certificate having private and public keys for the newly assembled attested identity. The certificate may be used to provide authenticity to the attested identity and may be necessitated by policy. The public and private key pairs may also permit the IA to sign the attested identity with a signature associated with the attested identity. The attested identity service may facilitate the acquisition of the keys and/or certificate via a certificate authority. In some cases, the IA may use the attested identity service to house its private key for the attested identity; if this occurs the IA could use the attested identity from any environment or device so long as the IA authenticates via a network to the attested identity service. Policy may drive what is required in terms of signatures, certificates, and locations of the same.

According to an embodiment, at 161, the attested identity service may finalize the attested identity process once it assures itself that the IA has a valid end-user agreement with the attested identity service or with the service that the attested identity service is acting for. If such an agreement is required by policy, then such requirement may be presented to the IA at the beginning of the application process so as to prevent unnecessary processing between the IA and the attested identity service if no agreement is on file. If the IA accepts the agreement, then the agreement is digitally signed and becomes part of the attested identity. Moreover, the agreement may be associated with expiring events or temporal constraints, which when detected revoke the attested identity and require a new or updated agreement. It should be noted, that some agreement may require payment before they are accepted, in such cases external payment services may be used to facilitate the payment.

Upon the conclusion of processing, the IA has a valid attested identity with the attested identity service. Updates and maintenance for the attested identity are managed by the attested identity service on behalf of the IA. If the IA wants to access a resource, the appropriate assertion is presented to the resource from the attested identity. The resource inspects the assertion to validate it, and if valid, grants access to the IA as the attested identity; the roles, rights, and permissions of the access are governed by the assertion.

Figure 2:
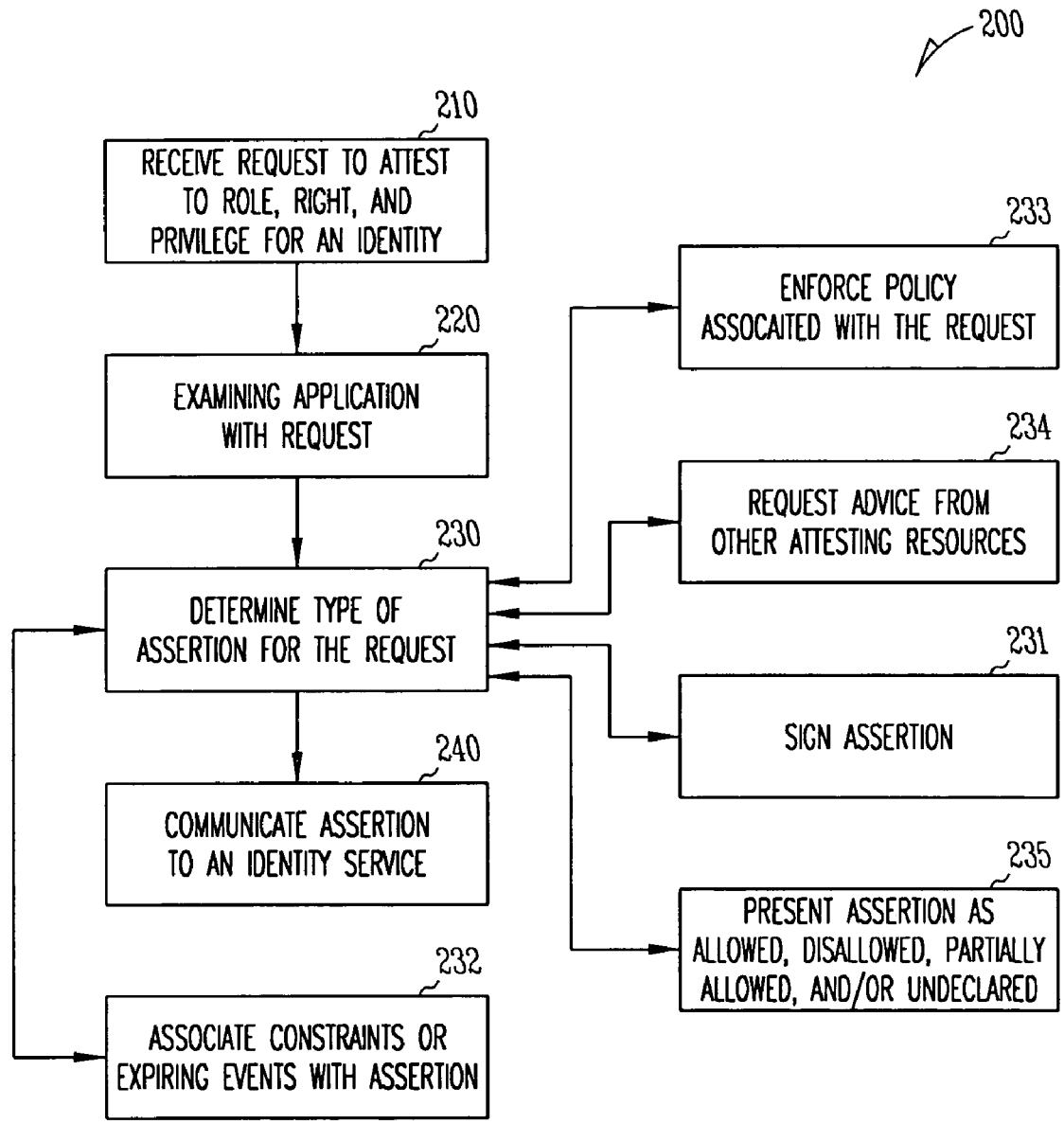
FIG. 2 is a diagram of a method for generating an assertion for a portion of an attested identity, according to an example embodiment.

FIG. 2 is a diagram of a method 200 for generating an assertion for a portion of an attested identity, according to an example embodiment. The method 200 (hereinafter "attestation service") is implemented in a machine-accessible and readable medium.

The attestation service represents the processing of an attesting resource that interacts with the attesting service represented by the method 100 of FIG. 1. The attestation service inspects applications of IA for an attested identity for information relevant to a resource under the control of the attestation service and in response generates an assertion that is provided back to an attesting service that is formulating the attested identity for the IA.

At 210, the attestation service receives a request to attest to a role, right, and/or privilege for an attested identity. In an embodiment, the request is received from an attesting service, such as the attesting service represented by the method 100 of FIG. 1. In some embodiments, the attestation service may provide assertions for more than one resource. That is, multiple resources or a set of resource may be within the purview of the attestation service. It should also be noted that policy and an identity provides the mechanism by which the attestation service can provide assertions on behalf of resources. The policies are dynamic and the status of the identity associated with the attestation service is dynamic. Thus, if a particular attestation service is terminated or limited in its role to grant roles, rights, and privileges to a resource, then any assertions provided by that attestation service may be revoked or recalled dynamically. This provides a mechanism to control and perhaps prevent surreptitious behavior.

At 220, the attestation service examines an application associated with the request for an assertion. The examination may be driven by policy and may necessitate accessing a variety of repositories to acquire additional information. In some cases, the attestation service may request that the attesting service acquire additional information from the IA for purposes of satisfying the request for an assertion for this particular attested identity.

At 230, the attestation service determines a type of assertion that is relevant or necessitated by the request. The type may be dictated by access required according to the application. For example, administrative access may be requested of a resource. Alternative, guest access may be request of the resource.

In an embodiment, at 231, the attestation service may sign the assertion to provide authenticity to the assertion. The signature may also be useful when a particular attestation service is terminated or altered such that its authority is no longer valid for a given assertion. Therefore, the signature serves as a mechanism for identifying the attestation service for a given assertion that forms a part of an attested identity.

According to an embodiment, at 232, the assertion may also be associated with its own constraints or expiring events. For example, the attestation service may associate a temporal constraint, such as a time-to-live attributed, and when the constraint is satisfied the assertion becomes invalid and is not recognized by the resource to which it is directed.

In an embodiment, at 233, the attestation service may enforce policy associated with the request. Policy may drive actions of the attestation service in assembling the assertion. So, policy may dictate that more information is needed, that more help or even assertions from other services are needed, that constraints are needed, that the assertion is to be a certain type under current conditions, and the like.

In some cases, at 234, the attestation service may request advice from other attesting resources or other instances of the attestation service, which are processing on behalf of those attesting resources. If the attestation service is waiting on advice from another attesting resource, it may, optionally, notify the attesting service that it is in a waiting pattern before the assertion can be provided. Again, policy may dictate when advice or permission of another attesting resource is needed.

According to another embodiment, at 235, the attestation service may represent the assertion as allowed for predefined roles, rights, and permissions; disallowed for predefined roles, rights, and permissions; partially allowed for pre-defined roles, rights, and permissions; and/or undeclared allowance for predefined roles, rights, and permissions. An undeclared situation may arise when the attestation service is in a waiting pattern or needs to dynamically resolve access when a particular request is made by the IA using the attested identity. That is, some roles, rights, and permissions may be declared at runtime based on local metrics or constraints. In these situations, an undeclared assertion may be used by the attestation service.

At 240, the attestation service communicates the assertion back to the identity service. The identity service, such as the attesting service represented by the method 100 of FIG. 1, updates the attested identity and provides the update to the IA in manners described above with FIG. 1.

The attestation service represents processing of an attesting resource. It is driven by policy and it provides assertions that form the attested identity for a particular IA. The IA may use an assertion, if permitted, for accessing a resource, which the IA may not have otherwise been permitted to access. The entire process of the attesting service of FIG. 1 and the attestation service of FIG. 2 represents a powerful technique to dynamically create in an automated fashion access roles, rights, and permissions to resources. The attested identities representing this information are centrally managed and controlled by the attesting service and changes are dynamically communicated and available in real time to IA's.

Figure 3:
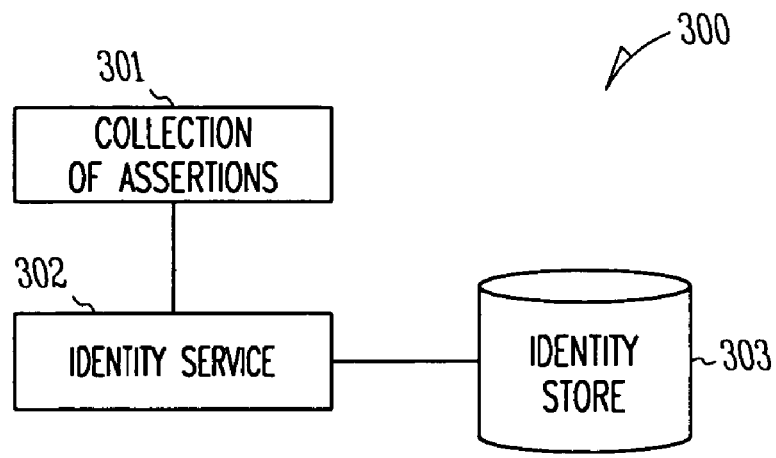
FIG. 3 is a diagram of an attested identity system, according to an example embodiment.

FIG. 3 is a diagram of an attested identity system 300, according to an example embodiment. The attested identity system 300 is implemented in a machine-accessible and readable medium and is operational over a network. The network may be wired, wireless, or a combination of wired and wireless. In an embodiment, the attested identity system 300 implements among other things the attesting identity service represented by the method 100 of FIG. 1. Also, the attested identity system 300 interacts and communicates with instances of an attestation service represented by the method 200 of FIG. 2.

The attested identity system 300 includes a collection or assertions 301 and an identity service 302. In some embodiments, the attested identity system 300 may also include an identity store 303. Each of these will now be discussed in turn.

The collection of assertions 301 are organized for a given attested identity and a given IA. Each assertion is acquired from an attesting resource. The attesting resource is authorized to grant and define access from a given resource. Examples of an attestation service that acts on behalf of an attesting resource were provided above with the method 200 of FIG. 2. The assertion defines roles, rights, and permissions of a given IA to a given resource. In some cases the assertion is also signed by the attesting resource to which it applies. The collection of assertions 301 represents an attested identity for a given IA.

The identity service 302 may be a modified version of the identity services, enumerated above, that are modified to perform the processing discussed herein. Additionally, the identity service 302 may be viewed as the processing of the attesting service represented by the method 100 of FIG. 1.

The identity service 302 enlists the services of the attesting resources to acquire the assertions. These assertions are then assembled to form the collection of assertions 301 that form the attested identity. Decisions about which attesting resource to contact are driven by information supplied to the identity service 302 by an IA.

In an embodiment, the identity service 302 establishes interactions with an IA to generate or derive an application for an attested identity. The interactions take place with context-driven forms. Examples of this interact were provided above with respect to the method 100 of FIG. 1.

The identity service 302 manages the collection of assertions 301 and dynamically updates the collection 301. Moreover, the identity service 302 sends real time and dynamic notifications to the effected IA of updates to its attested identity. Different portions of roles, rights, and permissions for any given assertion within the collection 301 may be activated at different points in time. When activation occurs, the identity service 301 updates the collection 301 appropriately and notifies the IA, which is affected.

In an embodiment, the identity service 302 may also acquire or facilitate acquiring a certificate and/or private and public key pairs on behalf of the attested identity and the IA. This may be used, pursuant to policy, to have the new attested identity or the IA sign the collection 301.

According to an embodiment, the identity service 302 may enforce a requirement that the IA have a valid and up-to-date end-user agreement before the attested identity is available for use and activated. Examples of this processing were provided above with the method 100 of FIG. 1.

The attested identity system 300 may also include one or more identity stores 303. The identity store 303 houses the attested identity and associates it as the collection 301 with a particular IA and associated any policies that drive the interaction. The identity store 303 may also house identifiers and attributes associated with IA. The identity stores may be local to the attested identity system 300, external to the attested identity system 300, and/or partially local and partially external to the attested identity system 300.

Figure 4:
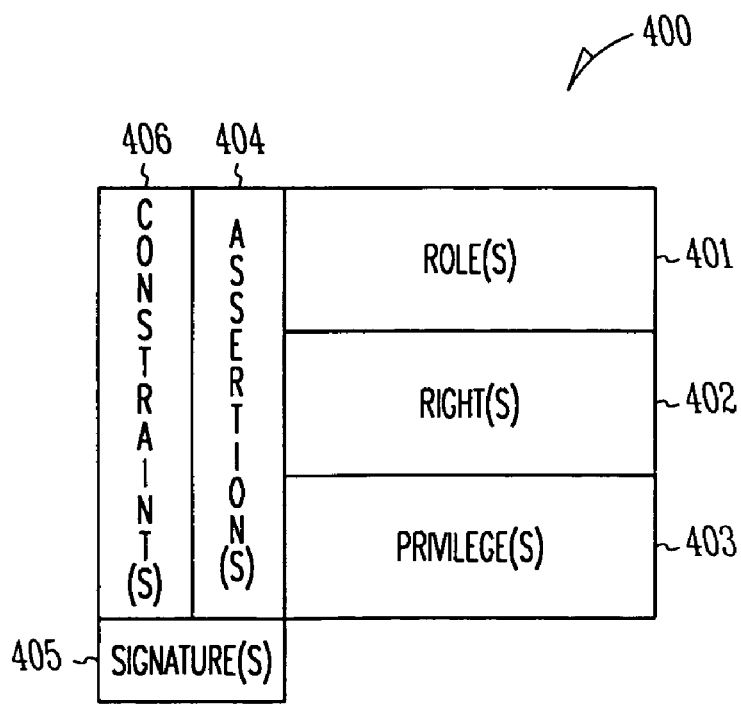
FIG. 4 is a diagram of a data structure representing an attested identity, according to an example embodiment.

FIG. 4 is a diagram of a data structure 400 representing an attested identity, according to an example embodiment. The data structure 400 is implemented in a machine-accessible and readable medium for purposes of providing an attested identity that is represented as a collection or roles, rights, privileges, and assertions. In an embodiment, the data structure 400 is initially populated by the attesting service represented by the method 100 of FIG. 1 and the identity service 301 of the attested identity system 100 of FIG. 3. Furthermore, the data structure 400 is augmented with assertions generated by attestation services, such as the attestation service represented by the method 200 of FIG. 2.

The data structure 400 includes one or more roles 401, one or more rights 402, one or more privileges 403, and one or more assertions 404. In some embodiments, the data structure 400 may also include one or more signatures 405 and/or one or more constraints 406. Each of these will now be discussed in turn.

The roles 401 represent the entity title that an attested identity assumes for a given context and interaction with a given resource. For example, under defined circumstances an attested identity may become an administrator (role) to a financial data store (resource).

The rights 402 and/or privileges 403 represent actions that a given role may take on a given resource. For example, an administrator (role) may write (access action) to a salary database (resource).

The roles 401, the rights 402, and privileges 403 may be associated with an attested identity and its interaction with an attesting service (resource) in a global sense. Additionally, a given subset or combination of the roles 401, the rights 402, and the privileges 403 are associated with a specific assertion 404.

The assertions 404 include values from the roles 402, the rights 402, and the privileges 403 as determined by an attesting resource for a given resource where access is desired. So, each individual and different assertion 404 represents different combination of the roles 401, the rights 402, and the privileges 402. Each assertion 404 also includes an indication or identifier for a given resource to which it relates and also includes an indication or identifier for the attesting resource that generated or provided the given assertion 404.

In some embodiments, the data structure also includes one or more signatures 405. Some signatures 405 may represent attesting resources that provided the assertions 404. Other signatures may represent the attesting service or identity service that provided the data structure 400, which represents instances of an attested identity. Still other signatures 405 may represent signatures of IA's or the attested identity or data structure 400 itself, if the data structure 400 acquires a private and public key pair or certificate on its own accord.

In still more embodiments, the data structure 400 may include one or more constraints 406. A constraint 406 may be globally associated with the entire data structure 400. Additionally, a constraint 406 may be associated with a given assertion 404. Still further, a constraint 406 may be associated with a given role 401, a given right 402, and/or a given privilege 403. A constraint 406 identifies a condition or event (temporal or otherwise) which may completely or partially revoke global or specific roles 401, rights 402, and/or privileges 403.

The data structure 400 is initially populated by an attesting or identity service using the assistance of one or more attestation services, which represent processing of attesting resources. Policies drive processing of the various services. The data structure 400 is selectively presented to resources by IA as an attested identity by using the assertions 404. The resources validate the assertions 404, in some cases via signatures 405, and provide access using the defined roles 401, rights 402, and privileges 403 represented in the presented assertion 404.

The data structure 400 alters the processing within machines when processed to provide an attested identity. The attested identity represents automated identity creation, maintenance, and use within a network of identities associated with an IA.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
receiving, by a computer system, a request for an identity from an applicant;
notifying, by the computer system, a plurality of attesting resources of the request, each attesting resource is a particular resource that has permission and authority to grant an attestation, each attesting resource generates one or more assertions when requested to do so, and each assertion is a statement that includes roles, rights, and privileges for the applicant with respect to a particular attesting resource and that statement includes an indication as to the particular attesting resource that made the statement and under what authority that particular attesting resource had to make the statement, and a decision as to which of the attesting resources that are to be notified are driven by the request and the additional information provided by the applicant;
acquiring, by the computer system, a plurality of assertions from the attesting resources for the identity, wherein acquiring further includes obtaining the assertions with signatures of the attesting resources;
assembling, by the computer system, an attested identity, the attested identity assembled as the identity with the plurality of assertions organized as a collection of the assertions for the identity;
providing, by the computer system, the attested identity with the assembled plurality of assertions to the applicant;
storing and managing, by the computer system, the attested identity within a local environment of the computer system for purposes of providing centralized management for and on demand access to the applicant; and
notifying, by the computer system, the applicant as certain rights, roles, and privileges are activated for the attested identity for purposes of permitting the applicant to acquire an updated form of the attested identity.

2. The method of claim 1 further comprising, assigning, by the computer system, the roles, rights, and privileges to the identity in response to a policy.

3. The method of claim 1 further comprising, interacting, by the computer system, with the applicant to assemble attributes about the applicant in response to one or more identifiers provided by the applicant.

4. The method of claim 3, wherein interacting further includes presenting a context-driven form to the applicant, wherein the form represents an application for the identity.

5. The method of claim 1 further comprising, communicating, by the computer system, instructions or information requests to the applicant before providing the identity.

6. The method of claim 1 further comprising, acquiring, by the computer system, one or more certificates for the identity.

7. The method of claim 6, wherein acquiring further includes receiving a digitally signed end user agreement from the applicant.

8. A system comprising:
a processor; and
a memory coupled with the processor and having stored therein a sequence of instructions which, when executed by the processor, cause the processor to create and maintain attested identities by:
receiving a request for an identity from an applicant;
notifying a plurality of attesting resources of the request, each attesting resource is a particular resource that has permission and authority to grant an attestation, each attesting resource generates one or more assertions when requested to do so, and each assertion is a statement that includes roles, rights, and privileges for the applicant with respect to a particular attesting resource and that statement includes an indication as to the particular attesting resource that made the statement and under what authority that particular attesting resource had to make the statement, and a decision as to which of the attesting resources that are to be notified are driven by the request and the additional information provided by the applicant;

acquiring a plurality of assertions from the attesting resources for the identity, wherein acquiring further includes obtaining the assertions with signatures of the attesting resources;

assembling an attested identity, the attested identity assembled as the identity with the plurality of assertions organized as a collection of the assertions;

providing the attested identity with the assembled plurality of assertions to the applicant;

storing and managing the attested identity within a local environment for purposes of providing centralized management for and on demand access to the applicant; and notifying the applicant as certain rights, roles, and privileges are activated for the attested identity for purposes of permitting the applicant to acquire an updated form of the attested identity.

9. The system of claim 8, further comprising, assigning the roles, rights, and privileges to the identity in response to a policy.

10. The system of claim 8, further comprising, interacting with the applicant to assemble attributes about the applicant in response to one or more identifiers provided by the applicant.

11. The system of claim 10, wherein interacting further includes presenting a context-driven form to the applicant, wherein the form represents an application for the identity.

12. The system of claim 8, further comprising, communicating instructions or information requests to the applicant before providing the identity.

13. The system of claim 8, further comprising, acquiring one or more certificates for the identity.

14. The system of claim 13, wherein acquiring further includes receiving a digitally signed end user agreement from the applicant.

15. A non-transitory computer-readable memory having stored therein a sequence of instructions which, when executed by a processor, causes the processor to create and manage attested identities by:

receiving a request for an identity from an applicant;

notifying a plurality of attesting resources of the request, each attesting resource is a particular resource that has permission and authority to grant an attestation, each attesting resource generates one or more assertions when requested to do so, and each assertion is a statement that includes roles, rights, and privileges for the applicant with respect to a particular attesting resource and that statement includes an indication as to the particular attesting resource that made the statement and under what authority that particular attesting resource had to make the statement, and a decision as to which of the attesting resources that are to be notified are driven by the request and the additional information provided by the applicant;

acquiring a plurality of assertions from the attesting resources for the identity, wherein acquiring further includes obtaining the assertions with signatures of the attesting resources;

assembling an attested identity, the attested identity assembled as the identity with the plurality of assertions organized as a collection of the assertions;

providing the attested identity with the assembled plurality of assertions to the applicant;

storing and managing the attested identity within a local environment for purposes of providing centralized management for and on demand access to the applicant; and notifying the applicant as certain rights, roles, and privileges are activated for the attested identity for purposes of permitting the applicant to acquire an updated form of the attested identity.

16. The non-transitory computer-readable memory of claim 15, further comprising, assigning the roles, rights, and privileges to the identity in response to a policy.

17. The non-transitory computer-readable memory of claim 15, further comprising, interacting with the applicant to assemble attributes about the applicant in response to one or more identifiers provided by the applicant.

18. The non-transitory computer-readable memory of claim 15, wherein interacting further includes presenting a context-driven form to the applicant, wherein the form represents an application for the identity.

19. The non-transitory computer-readable memory of claim 15, further comprising, communicating instructions or information requests to the applicant before providing the identity.

20. The non-transitory computer-readable memory of claim 15, further comprising, acquiring one or more certificates for the identity.

21. The non-transitory computer-readable memory of claim 20, wherein acquiring further includes receiving a digitally signed end user agreement from the applicant.

* * * * *

UNITED STATES PATENT AND TRADEMARK OFFICE
CERTIFICATE OF CORRECTION

| | | |
|---|---|---|
| PATENT NO. | : 8,281,374 B2 | |
| APPLICATION NO. | : 11/225994 | |
| DATED | : October 2, 2012 | |
| INVENTOR(S) | : Carter | |

It is certified that error appears in the above-identified patent and that said Letters Patent is hereby corrected as shown below:

On page 2, in column 1, under "Other Publications", line 8, delete "LinkopingSweden" and insert -- Linkoping, Sweden --, therefor.

On page 2, in column 2, under "Other Publications", line 7, delete "Explanatins," and insert -- Explanations, --, therefor.

On sheet 2 of 3, in figure 2, Box No. 233, line 2, delete "ASSOCAITED" and insert -- ASSOCIATED --, therefor.

Signed and Sealed this
First Day of January, 2013

David J. Kappos
*Director of the United States Patent and Trademark Office*